United States Patent
Feshenko et al.

(10) Patent No.: US 11,061,944 B2
(45) Date of Patent: Jul. 13, 2021

(54) INFERRING TOPOLOGICAL LINKAGES BETWEEN COMPONENTS

(71) Applicant: MICRO FOCUS LLC, Santa Clara, CA (US)

(72) Inventors: Dmitry Feshenko, Yehud (IL); Gabriel Dayan, Yehud (IL); Avihay Mor, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 856 days.

(21) Appl. No.: 15/419,707

(22) Filed: Jan. 30, 2017

(65) Prior Publication Data

US 2018/0218068 A1    Aug. 2, 2018

(51) Int. Cl.
*G06F 16/33* (2019.01)
*G06F 16/2455* (2019.01)
*G06F 16/9038* (2019.01)

(52) U.S. Cl.
CPC ........ *G06F 16/334* (2019.01); *G06F 16/2455* (2019.01); *G06F 16/9038* (2019.01)

(58) Field of Classification Search
None
See application file for complete search history.

(56) References Cited

U.S. PATENT DOCUMENTS

| 8,381,193 | B2 | 2/2013 | Cervantes | |
|---|---|---|---|---|
| 8,898,249 | B1* | 11/2014 | Bertz | H04W 60/00 709/217 |
| 8,976,710 | B2 | 3/2015 | Indukuri et al. | |
| 9,219,655 | B1* | 12/2015 | Kienzle | H04L 41/12 |
| 2003/0097438 | A1* | 5/2003 | Bearden | H04L 41/0213 709/224 |
| 2003/0125909 | A1* | 7/2003 | Wen | H04L 67/1002 702/188 |
| 2004/0046785 | A1* | 3/2004 | Keller | G06F 9/5061 715/734 |
| 2005/0076139 | A1* | 4/2005 | Jinmei | H04L 61/1511 709/245 |
| 2005/0138173 | A1* | 6/2005 | Ha | H04L 29/12113 709/203 |
| 2008/0065749 | A1* | 3/2008 | Kucukyavuz | G06F 15/17375 709/223 |
| 2008/0104276 | A1* | 5/2008 | Lahoti | H04L 61/10 709/245 |

(Continued)

FOREIGN PATENT DOCUMENTS

WO    WO-15112112 A1    7/2015

OTHER PUBLICATIONS

IBM Corporation, "Discovery Guide," (Research Paper), copyright 2006, 2013, Network Manager IP Edition, Version 4 Release 1, 484 pages, available at http://www.ibm.com/support/knowledgecenter/SSSHRK_4.1.0/nmip_pdf_discovery_41.pdf.

(Continued)

*Primary Examiner* — Christopher J Raab

(57) ABSTRACT

In some examples, a host name that is known to correspond to a first source component may be identified. The host name may be searched in a second source component. A topological linkage may be inferred between the first and the second source component in response to finding the host name in the second source component.

20 Claims, 6 Drawing Sheets

(56) References Cited

U.S. PATENT DOCUMENTS

| | | | |
|---|---|---|---|
| 2010/0235915 A1* | 9/2010 | Memon | H04L 63/145 |
| | | | 726/23 |
| 2011/0154367 A1 | 6/2011 | Gutjahr et al. | |
| 2013/0188520 A1* | 7/2013 | Muntianu | H04L 67/2842 |
| | | | 370/255 |
| 2014/0258536 A1* | 9/2014 | Chiong | H04L 47/125 |
| | | | 709/226 |
| 2014/0304401 A1 | 10/2014 | Jagadish et al. | |
| 2014/0317137 A1* | 10/2014 | Hanaoka | G06F 17/40 |
| | | | 707/758 |
| 2016/0072761 A1 | 3/2016 | Shih | |
| 2016/0253425 A1* | 9/2016 | Stoops | G06F 16/9535 |
| | | | 707/754 |

OTHER PUBLICATIONS

U.S. Appl. No. 15/280,940, filed Sep. 29, 2016, Alon et al.
Hewlett Packard Enterprise, "Configuration Management System (CMS)," (Web Page), copyright 2017, 6 pages, available at http://www8.hp.com/us/en/software-solutions/configuration-management-system-database/.
Hewlett Packard Enterprise, "Network Management," (Web Page), copyright 2017, 9 pagees, available at http://www3.hp.com/us/en/software-solutions/network-rnariagement/.
Turner, A. et al., "Automatic Discovery of Relationships Across Multiple Network Layers," (Research Paper), Aug. 27-31, 2007, 6 pages, available at http://conferences.sigcomm.org/ sigcomm/2007/inm/papers/inm07-1569047223.pdf.

* cited by examiner

INFERRING TOPOLOGICAL LINKAGES BETWEEN COMPONENTS

BACKGROUND

In some examples, data may be collected from source components of computer systems. The source components may include, for example, hardware and/or software components, such as web services, enterprise applications, storage systems, databases, servers, etc.

BRIEF DESCRIPTION

Some examples are described with respect to the following figures.

FIGS. 3, 6, 7, and 8 are flow diagrams illustrating methods according to some examples.

DETAILED DESCRIPTION

The following terminology is understood to mean the following when recited by the specification or the claims. The singular forms "a," "an," and "the" mean "one or more." The terms "including" and "having" are intended to have the same inclusive meaning as the term "comprising."

A "topology" of a computer system may be the way that components of the computer system are related, i.e. "topologically linked". In some examples, issues or malfunctions in a first component may be the cause of issues or malfunctions in a second component that is topologically linked to the first component. In other examples, issues or malfunctions in topologically linked components are common effects of the same issues or malfunctions. Therefore, generating a topology model representing the topology of a computer system may be helpful for IT management of that computer system. However, tracking changes in the topology of a computer system in the topology model may be difficult due to frequent and major changes in the topology.

Unstructured data (e.g. log messages) and structured data (e.g. data in fields of tables) may be collected from the source components of computer systems A "log message" is a textual message. In some examples, log messages may include human-readable text. In some examples, log messages may indicate events, such as errors, occurring in a computing system. Log messages may, for example, be stored in log files. Additionally, structured data may be stored in fields of database tables, and may also contain various types of information associated with the computing system.

Each of these data may be generated by, stored on, and collected from source components of a computer system such as a computer network, and may be used in system development for debugging and understanding the behavior of a system. This data may store a large amount of information describing the behavior of systems. For example, systems may generate thousands or millions of pieces of data (e.g. log messages or structured data) per second.

Accordingly, the present disclosure provides examples in which this data is used to generate topology models of computer systems. Because the abovementioned data may, for example, already be collected for various purposes other than for generating topology models, little additional computational overhead may be expended in using this data messages to generate topology models.

Figure 1:
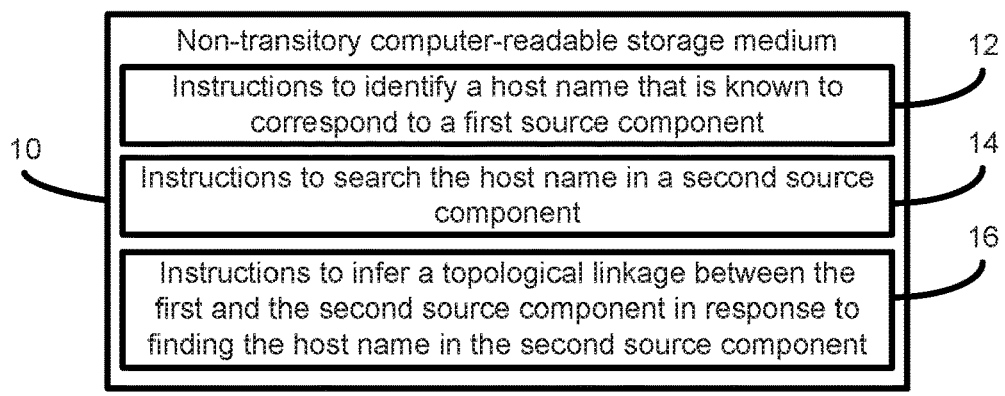
FIG. 1 is a block diagram illustrating a non-transitory computer readable storage medium according to some examples.

FIG. 1 is a block diagram illustrating a non-transitory computer readable storage medium 10 according to some examples. The non-transitory computer readable storage medium 10 may include instructions 12 executable by a processor to identify a host name that is known to correspond to a first source component. The non-transitory computer readable storage medium 10 may include instructions 14 executable by a processor to search the host name in a second source component. The non-transitory computer readable storage medium 10 may include instructions 16 executable by a processor to infer a topological linkage between the first and the second source component in response to finding the host name in the second source component. A "source component" may be understood to be any host that has a host name.

Figure 2:
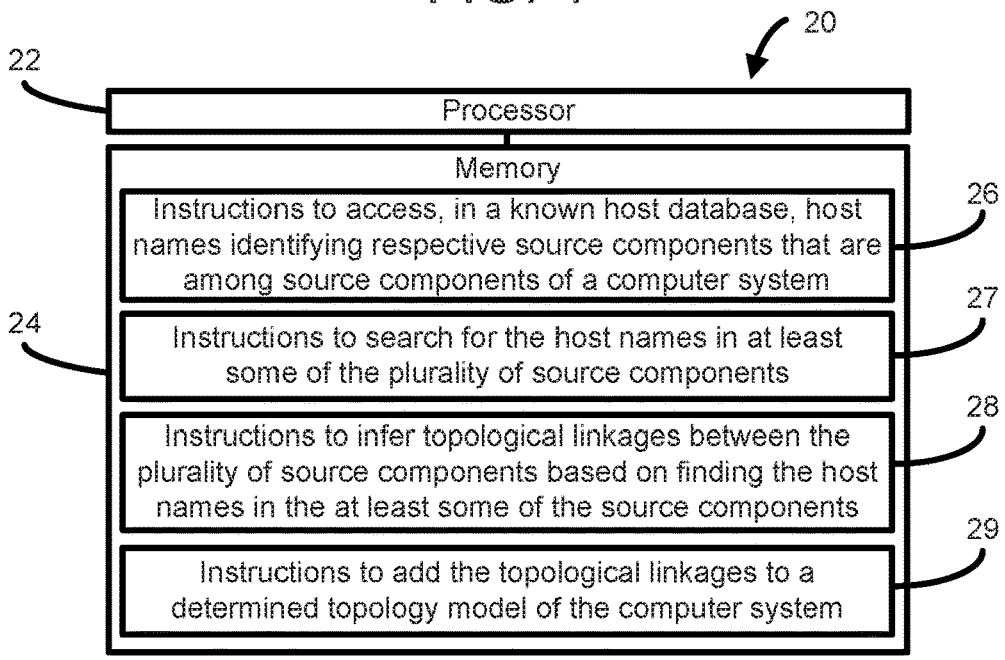
FIGS. 2 and 4 are block diagrams illustrating systems according to some examples.

FIG. 2 is a block diagram illustrating a system 20 according to some examples. The system 20 may include a processor 22 and a memory 24. The memory 24 may include instructions 26 executable by the processor to access, in a known hosts database, host names identifying respective source components that are among a plurality of source components of a computer system. The memory 24 may include instructions 27 executable by the processor to search for the host names in at least some of the plurality of source components. The memory 24 may include instructions 28 executable by the processor to infer topological linkages between the plurality of source components based on finding the host names in the at least some of the plurality of source components. The memory 24 may include instructions 29 executable by the processor to add the topological linkages to a determined topology model of the computer system.

Figure 3:
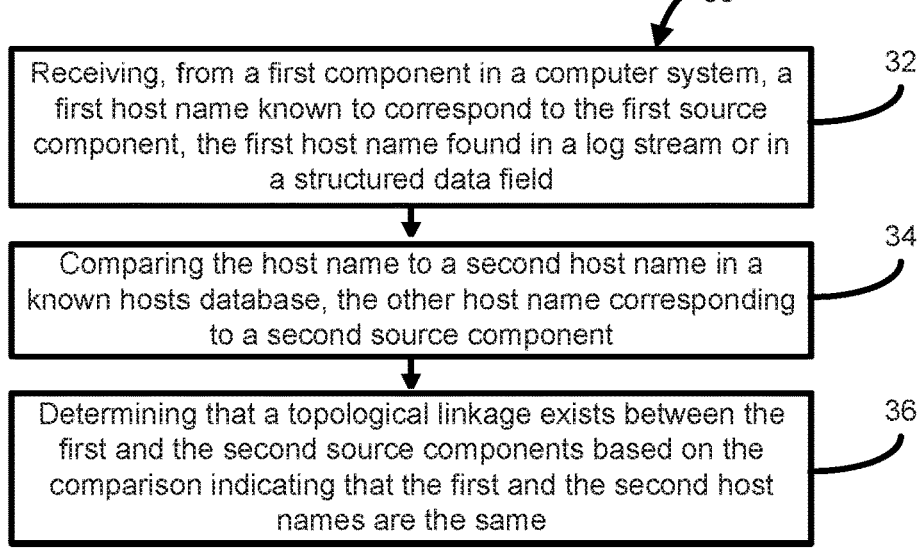

FIG. 3 is a flow diagram illustrating a method 30 according to some examples. The following may be performed by a processor. The method 30 may include: at 32, receiving, from a first component in a computer system, a first host name known to correspond to the first source component, the first host name found in a log stream or in a structured data field; at 34, comparing the host name to a second host name in a known hosts database, the other host name corresponding to a second source component; and at 36, determining that a topological linkage exists between the first and the second source components based on the comparison indicating that the first and the second host names are the same.

Figure 4:
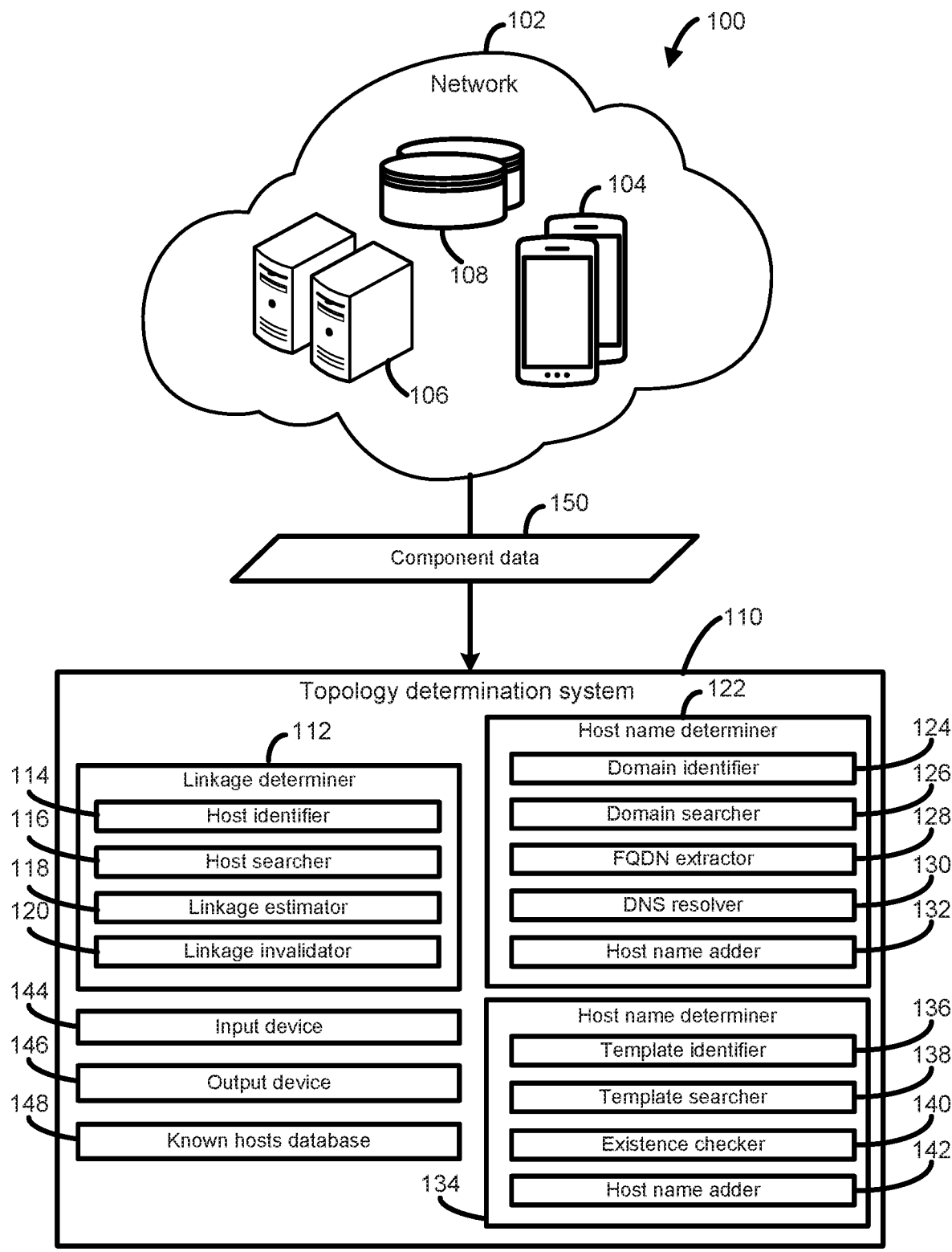

FIG. 4 is a block diagram illustrating a system 100 according to some examples. The system 100 includes a computer system such as a network 102. The network 102 may include an application layer that includes applications 104 (e.g. mobile applications, web applications, on-premises applications, cloud based applications, etc., which may be used by end users), e.g. running on user computing devices or other computing devices such as servers. The network 102 may include a computing layer including computing devices 106 such as servers, and a database layer including databases 108. Each of the databases 108 may be accessible to each of the applications 104, for example through the computing devices 106. Other devices may also be present in the network 102, such as printing devices, etc. The network 102 may, for example, be a local area network (LAN), wide area network (WAN), the Internet, or any other network. In some examples, the network 102 may comprise components of an information technology (IT) infrastructure of an organization, such as a data center. Each of the applications 104, computing devices 106, and databases 108 may comprise a component or multiple components. These components may, for example, each include a memory such as non-transitory computer readable medium to store log messages.

The system 100 may include topology determination system 110. The topology determination system may include linkage determiner 112 and host name determiners 122 and 134.

The linkage determiner 112 may determine a topology using host names found in source components in the network 102. The linkage determiner 112 may include host identifier 114, host searcher 116, linkage estimator 118, and linkage invalidator 120.

The host name determiner 122 may determine host names to be searched in the source components based on known domain names. The host name determiner 122 may include domain identifier 124, domain searcher 126, fully qualified domain name (FQDN) extractor 128, domain name system (DNS) resolver 130, and host name adder 132.

The host name determiner 134 may determine host names to be searched in the log messages based on known host name templates (e.g. regexes). The host name determiner 134 may include template identifier 136, template searcher 138, existence checker 140, and host name adder 142.

The topology determination system 110 may support direct user interaction. For example, the topology determination system 110 may include user input devices 144, such as a keyboard, touchpad, buttons, keypad, dials, mouse, track-ball, card reader, or other input devices. Additionally, the topology determination system 110 may include output devices 146 such as a liquid crystal display (LCD), video monitor, touch screen display, a light-emitting diode (LED), or other output devices. The output devices may be responsive to instructions to display a visualization including textual and/or graphical data, including representations of log messages, topological linkages between components, eventual estimated topology, and any other data generated during any part of the processes described herein.

In some examples, components of the linkage determiner 112 (host identifier 114, host searcher 116, linkage estimator 118, and linkage invalidator 120), host determiner 122 (domain identifier 124, domain searcher 126, fully qualified domain name (FQDN) extractor 128, domain name system (DNS) resolver 130, and host name adder 132), and host determiner 134 (template identifier 136, template searcher 138, existence checker 140, and host name adder 142) may each be implemented as a computing system including a processor, a memory such as non-transitory computer readable medium coupled to the processor, and instructions such as software and/or firmware stored in the non-transitory computer-readable storage medium. The instructions may be executable by the processor to perform processes defined herein. In some examples, the components of the linkage determiner 112 and the host determiners 122 and 134 mentioned above may include hardware features to perform processes described herein, such as a logical circuit, application specific integrated circuit, etc. In some examples, multiple components may be implemented using the same computing system features or hardware.

In some examples, the topology determination system 110 may receive component data 150 from source components in a computer system such as the network 102. The component data 150 may be used by the linkage determiner 112 and host name determiners 122 and 134 for topology determination. The data may include structured data (e.g. data in known fields such as in tables) or unstructured data (e.g. log message streams including log messages). In some examples, each piece of component data 150 may be associated with a source component ID which may be collected along with the component data 150. A source component ID may represent a source component from which the component data 150 was collected. Each piece of component data 150 may include a timestamp representing a time when the data (e.g. log message, or data in a table) was generated. The timestamps may include times that are synchronized across different source components.

In examples involving log messages, the log messages may include a description of an event associated with the source component such as an error. This description may include text that is not variable relative to other similar messages representing similar events. However, at least part of the description in each log message may additionally include variable parameters such as, for example, varying textual (e.g. numerical) metrics. In examples involving fields in tables, the variable metrics may be found in the known fields.

In particular, these variable metrics in the component data 150 may include host names such as web addresses, IPv4 addresses, IPv6 addresses, templates of host names (e.g. regexes), and FQDNs. The variable metrics may also include domain names and FQDNs. The component data 150 may also include other host names and domain names that can be used for component identification.

The topology determination system 110 may include known hosts database 148, which may be implemented as a memory such as non-transitory computer readable medium storing each of the variable metrics described above that are derived from the component data 150. That is, the known hosts database 148 may include a list of known host names that are known to correspond to various source components in the network 102.

As discussed earlier, the linkage determiner 112 may determine a topology using host names found in source components in the network 102.

In some examples, the host identifier 114 may identify, in the known hosts database 148, host names that are known to correspond to respective source components. In some examples, host names may comprise a web address, IPv4 address, IPv6 address, or other suitable address. In an example, a host name in the known hosts database 148 may be the web address "gcu91069.houston.abc.com" and may correspond to a particular source component.

In some examples, for each host name identified by the host identifier 114, the host searcher 116 may search for the host name in the plurality of source components (e.g. all of the source components) in the network 102. In some examples, for each host name, the search may not be performed on the source component corresponding to that host name, but may be performed on any of the other source components in network 102.

The search may be performed on component data 150 in the source components of the network 102. For example, the component data 150 may be collected by the topology determination 110 to allow searching, as discussed earlier.

In an example, the log message in Table 1 may be found in source component having host name "g5t2363.atlanta.abc.com".

TABLE 1

Log message in source component "g5t2363.atlanta.abc.com"

2014-01-24 21:42:14,152 [ajp-0.0.0.0-8009-3] (PMConfigImpl.java:580) INFO - Adding PM configuration for DB: ID = 21. DBContext = dbType=(ORACLE Server); hostName=gcu91069.houston.abc.com; dbName=CLD_HPBSM_PROFSIS; userName= CLD_HPBSM_PROFSIS; server=gcu91069.houston.abc.com; sid=bsmcldi; port=1526

Thus, the host searcher 116 may search for host name "gcu91069.houston.abc.com" and find it in the log message of Table 1.

In some examples, the linkage estimator 118 may, in response to finding the host name (e.g. "gcu91069.houston.abc.com") corresponding to a first source component in another source component having another host name (e.g. "g5t2363.atlanta.abc.com"), infer a first order topological linkage between the first and the second source components. The linkage estimator 118 may perform this inference for any pairs of source components in which the host name of a first component was found in the second component. In this way, the inferred topological linkages together may form a topology of the source components.

In some examples, a topological linkage may be inferred between a first source component having a host name and a second source component in response to finding a threshold amount of plurality of instances of the host name of the first source component in the second source component. In some examples, the threshold amount may be a threshold number of plurality of instances. In other examples, the threshold amount may be a threshold percentage of plurality of instances, e.g. a percentage of instances of the host name of the first source component relative to all host names found in the second source component. The threshold amount may be calculated in other ways as well.

Each of these topological linkages inferred above may be "first order" topological linkages, in that each topological linkage is based on finding a first host name of a first source component in a second source component. However, if a first topological linkage is inferred between a first and a second source component, and a second topological linkage is inferred between the second and a third source components, then a "second order" topological linkage may be inferred between the first and the third source components. Similarly, if additionally a third topological linkage is found between the third and a fourth source component, then a "third order" topological linkage may be inferred between the first and the fourth source components.

However, in examples, the linkage estimator 118 may not infer topological linkages above a maximum nth order topological linkage. For example, the maximum may be a second order topological linkage, such that a third order topological linkage would not be inferred between the first and the fourth source components. The maximum may be configurable (e.g. tunable by a user using the input devices 144) to achieve the best topology determination performance. The configuration setting may be stored in the topology determination system 110.

In some examples, the linkage invalidator 120 may, for each topological linkage, invalidate the topological linkage after a threshold period of time has elapsed. In some examples, the invalidation may occur after a threshold period of time has elapsed since the time in the timestamp associated with the log message of data structure containing the identified host name (e.g. "gcu91069.houston.abc.com"). In some examples, the invalidation may occur after a threshold period of time has elapsed since the time that the topological linkage was identified. Additionally, in some examples, a known host name in the known hosts database 148 corresponding to an invalidated topological linkage may be removed from the known hosts database 148 if it is no longer associated with any two components involved in still-valid topological linkage. In this way, the determined topology may be kept fresh and updated by the linkage invalidator 120.

In some examples, the linkage determiner 112 may operate continually while the network 102 is online, such that the topology is continually updated as more component data 150 is generated in the network 102. The linkage determiner 112 may also output the topology for display on output devices 146. The visualization of the topology may be continually updated in real-time, allowing a user (using input devices 144) to tune configuration settings, and in some examples, manually direct which host names to search and/or which source components to search in.

As discussed earlier, the host name determiner 122 may determine host names to be searched in the source components based on known domain names. Thus, in some examples, the host name determiner 122 may operate before the linkage determiner 112, or may concurrently operate, but host names may be searched by the linkage determiner 112 after the identification of the host names by the host name determiner 122.

In some examples, the domain identifier 124 may identify, in the known hosts database 148, known domain names, such as "abc.com".

In some examples, for each domain name identified by the domain identifier 124, the domain searcher 126 may search for the domain name in the plurality of source components (e.g. all of the source components) in the network 102. Thus, the domain searcher 126 may search for domain name "abc.com" and find it in component data 150 in at least one source component of the network 102. The component data 150 may be collected by the topology determination 110 to allow searching, as discussed earlier.

In some examples, a host name may be derived from the known domain name in response to finding an instance of the known domain name in at least one of the plurality of source components. The derivation may, for example, be performed using the FQDN extractor 128, or in by a combination of the FQDN extractor 128 and DNS resolver 130.

In some examples, the FQDN extractor 128 may extract a fully qualified domain name (FQDN) in which the instance of the known domain name was found. For example, the extracted FQDN from the domain name "abc.com" may be the web address "gcu91069.houston.abc.com" (i.e. the example host name described as identified by the host identifier 114). In some examples, the FQDN extractor 128 may designate the FQDN as the known host name, and the host name adder 132 may add the designated host name to the known hosts database 148.

In some examples, after FQDN extraction, instead of designating the FQDN as the known host name, the DNS resolver 130 may determine the host name by using Domain Name System (DNS) resolution on the extracted FQDN, and then the host name adder 132 may add the determined host name to the known hosts database 148. The determined host name after DNS resolution may, for example, be in the form if an IPv4 or IPv6 address.

As discussed earlier, the host name determiner 134 may determine host names to be searched in the log messages based on known host name templates (e.g. regexes). Thus, in some examples, the host name determiner 134 may operate before the linkage determiner 112, or may concurrently operate, but host names may be searched by the linkage determiner 112 after the identification of the host names by the host name determiner 134.

In some examples, the template identifier 136 may identify, in the known hosts database 148, host name templates, such as "((?:(?:25[0-5]|2[0-4][0-9]|[01]?[0-9][0-9]?)\.){3}(?:25[0-5]|2[0-4][0-9]|[01]?[0-9][0-9]?))", which is a regular expression (regex) for an IPv4 address.

In some examples, for each host name template identified by the template identifier 136, the template searcher 138 may search, in the plurality of source components (e.g. all of the source components) of the network 102, for particular host names corresponding to the identified host name template. Thus, the template searcher 138 may search for the host names corresponding to the host name template "((?:(?:25[0-5]|2[0-4][0-9]|[01]?[0-9][0-9]?)\.){3}(?:25[0-5]|2[0-4][0-9]|[01]?[0-9][0-9]?))" and find it in component data 150 in at least one source component of the network 102. The component data 150 may be collected by the topology determination 110 to allow searching, as discussed earlier.

In some examples, the existence checker 140 may perform an existence check on the host names found by the template searcher 138 to determine if the host name corresponds to a real source component, e.g. by pinging the source component or performing any other suitable checks. The host name adder 142 may, in response to the existence check passing, add the host names found to correspond to the host name template to the known hosts database 148.

Figure 5:
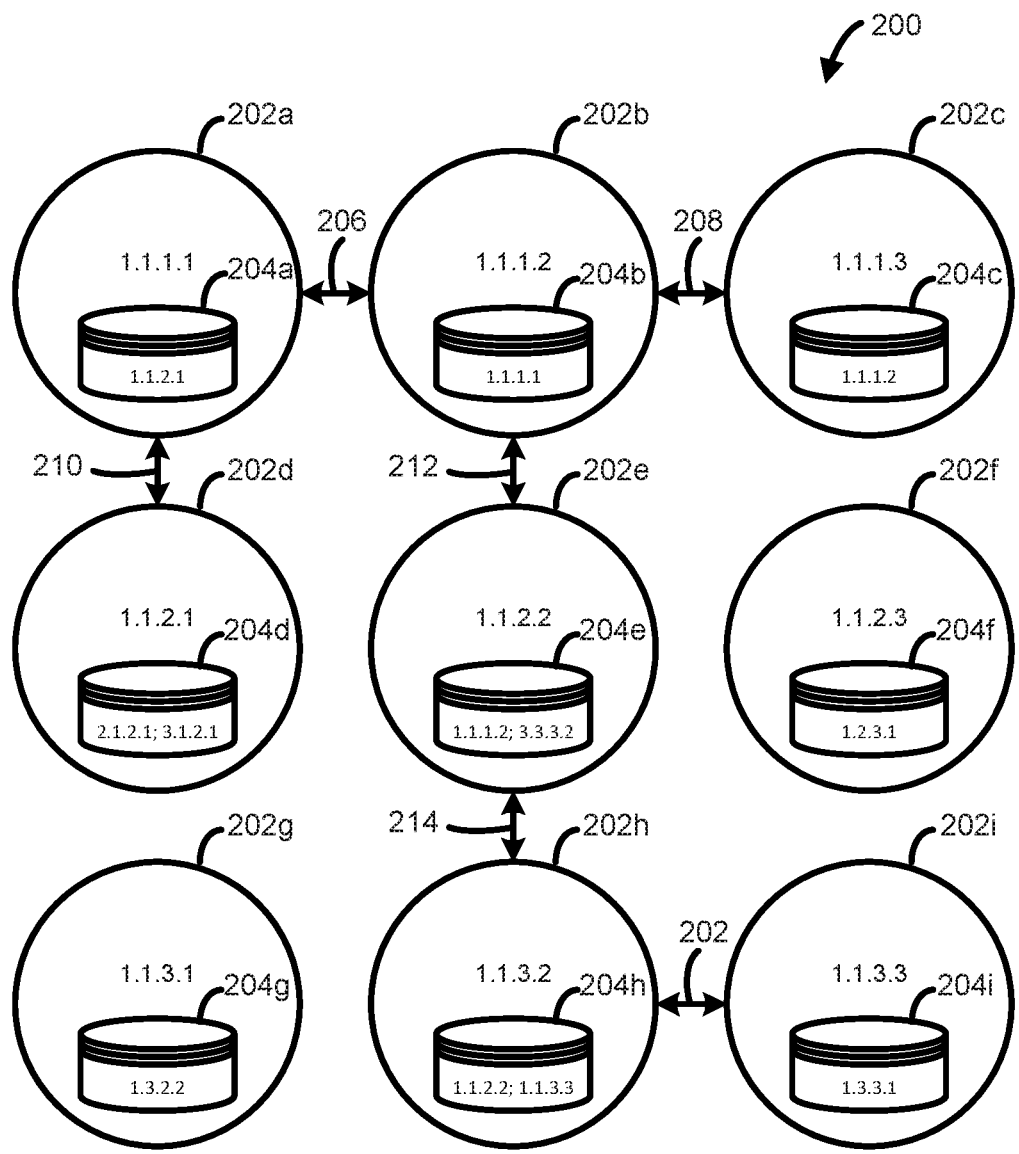
FIG. 5 is a schematic diagram illustrating source components and topological linkages between the source components according to some examples.

FIG. 5 is a schematic diagram 200 illustrating source components 202a to 202i and topological linkages 206 to 214 between the source components 202a to 202i according to some examples. The source components 202a to 202i respectively include component data 204a to 204i including unstructured data (e.g. log messages) and structured data (e.g. data in table fields). Host names are shown in the component data 204a to 204i in FIG. 5, with some source components containing one host name and others containing multiple host names. Table 2 illustrates the inferred first order topological linkages using the topology determination system 110, and Table 3 illustrates the inferred second order topological linkages using the topology determination system 110. In this example, the maximum order is second order, and therefore no higher order topological linkages are inferred (e.g. third, fourth, etc.)

TABLE 2

Inferred first order topological linkages

| First source component corresponding to first host name | Second source component in which first host name is found |
|---|---|
| 1.1.1.1 | 1.1.1.2 |
| 1.1.1.2 | 1.1.1.3 |
| 1.1.2.1 | 1.1.1.1 |
| 1.1.1.2 | 1.1.2.2 |
| 1.1.2.2 | 1.1.3.2 |
| 1.1.3.3 | 1.1.3.2 |

TABLE 3

Inferred second order topological linkages

| First source component | Second source component |
|---|---|
| 1.1.1.1 | 1.1.1.3 |
| 1.1.2.1 | 1.1.1.2 |

TABLE 3-continued

Inferred second order topological linkages

| First source component | Second source component |
|---|---|
| 1.1.1.1 | 1.1.2.2 |
| 1.1.1.3 | 1.1.2.2 |
| 1.1.1.2 | 1.1.3.2 |
| 1.1.2.2. | 1.1.3.3. |

Figure 6:
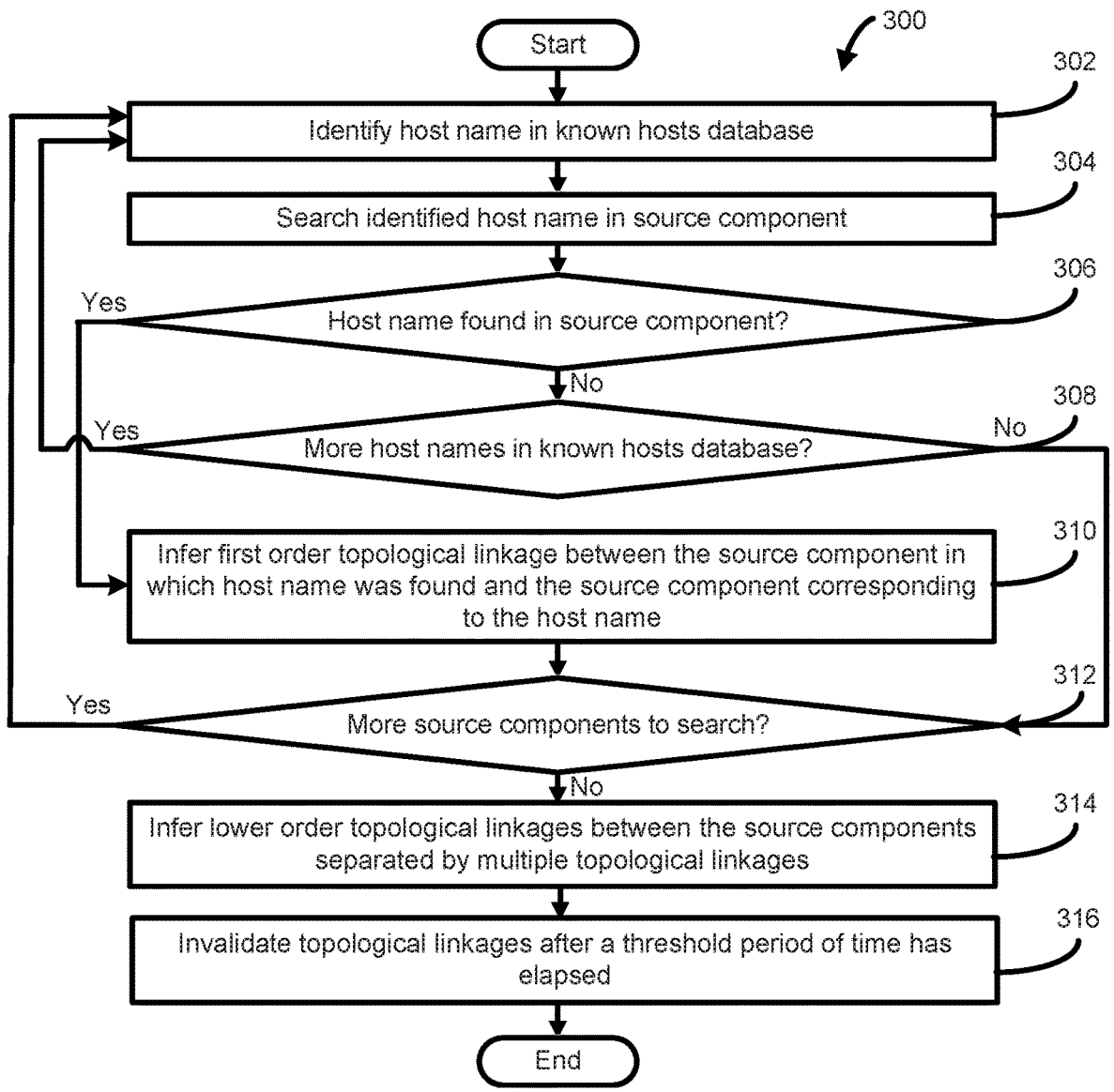

FIG. 6 is a flow diagram illustrating a method 300 according to some examples. In some examples, the orderings shown may be varied, some elements may occur simultaneously, some elements may be added, and some elements may be omitted. In describing FIG. 6, reference will be made to elements described in FIG. 4. In examples, any of the elements described earlier relative to FIG. 4 may be implemented in the process shown in and described relative to FIG. 6.

At 302, the host identifier 114 may identify, in the known hosts database 148, a host name that is known to correspond to a source component. Any processes previously described as implemented by the host identifier 114 may be implemented at 302.

At 304, for each host name identified by the host identifier 114, the host searcher 116 may search for the host name in at least one source component in the network 102. Any processes previously described as implemented by the host searcher 116 may be implemented at 304.

At 306, if the host name is found in the source component, the method 300 may proceed to 310, otherwise the method 300 may proceed to 308.

At 308, if there are more host names in the known hosts database 148, the method 300 may proceed to 302, otherwise the method 300 may proceed to 312.

At 310, the linkage estimator 118 may, in response to finding the host name in the searched source component, infer a topological linkage between the source component in which host name was found and the source component corresponding to the host name. Any processes previously described as implemented by the linkage estimator 118 may be implemented at 310.

At 312, if there are more source components to search, the method 300 may proceed to 302, otherwise the method 300 may proceed to 314.

At 314, the linkage estimator 118 may infer lower order topological linkages between source components for which first order topological linkages are already inferred. Any processes previously described as implemented by the linkage estimator 118 may be implemented at 314.

At 316, the linkage invalidator 120 may, for each topological linkage, invalidate the topological linkage after a threshold period of time has elapsed. Any processes previously described as implemented by the linkage estimator 118 may be implemented at 314. The method 300 may then end. In some examples, the method 300 may continually operate in an online mode and return to 316.

Figure 7:
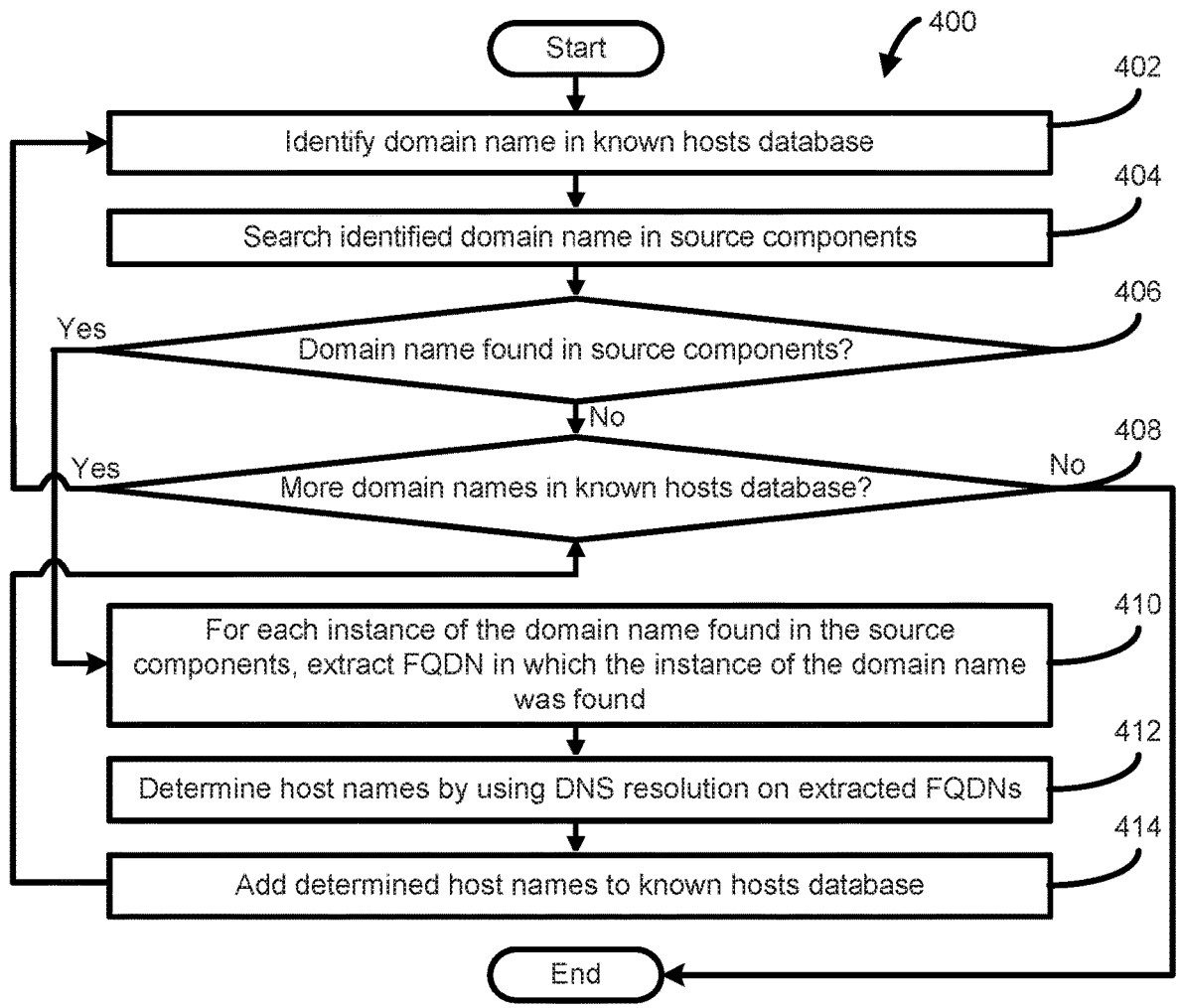

FIG. 7 is a flow diagram illustrating a method 400 according to some examples. In some examples, the orderings shown may be varied, some elements may occur simultaneously, some elements may be added, and some elements may be omitted. In describing FIG. 7, reference will be made to elements described in FIG. 4. In examples, any of the elements described earlier relative to FIG. 4 may be implemented in the process shown in and described relative to FIG. 7.

At 402, the domain identifier 124 may identify, in the known hosts database 148, known domain names. Any processes previously described as implemented by the domain identifier 124 may be implemented at 402.

At 404, for each domain name identified by the domain identifier 124, the domain searcher 126 may search for the domain name in the plurality of source components in the network 102. Any processes previously described as implemented by the domain searcher 126 may be implemented at 404.

At 406, if the domain name is found in any source components, the method 400 may proceed to 410, otherwise the method 400 may proceed to 408.

At 408, if there are more domain names in the known hosts database 148, the method 400 may proceed to 402, otherwise the method 400 may end.

At 410, for each instance of the known domain name found in the source components, the FQDN extractor 128 may extract a fully qualified domain name (FQDN) in which the instance of the known domain name was found. In some examples, the method 400 may then designate the FQDN as the known host name, and the method 400 may skip 412 and proceed to 414. In other examples, the method 400 may proceed to 412. Any processes previously described as implemented by the FQDN extractor 128 may be implemented at 410.

At 412, the DNS resolver 130 may determine the host name by using Domain Name System (DNS) resolution on the extracted FQDN. Any processes previously described as implemented by the DNS resolver 130 may be implemented at 412.

At 414, the host name adder 132 may add the determined host name to the known hosts database 148. Any processes previously described as implemented by the host name adder 132 may be implemented at 414. The method 400 may proceed to 408.

In some examples, the method 400 may not end, and may continually operate in an online mode, and instead of ending after 408 returns "no", the method 400 may proceed to 402. At that point, the topology may need refreshing, and/or new domain names may be available in the known hosts database 148.

Figure 8:
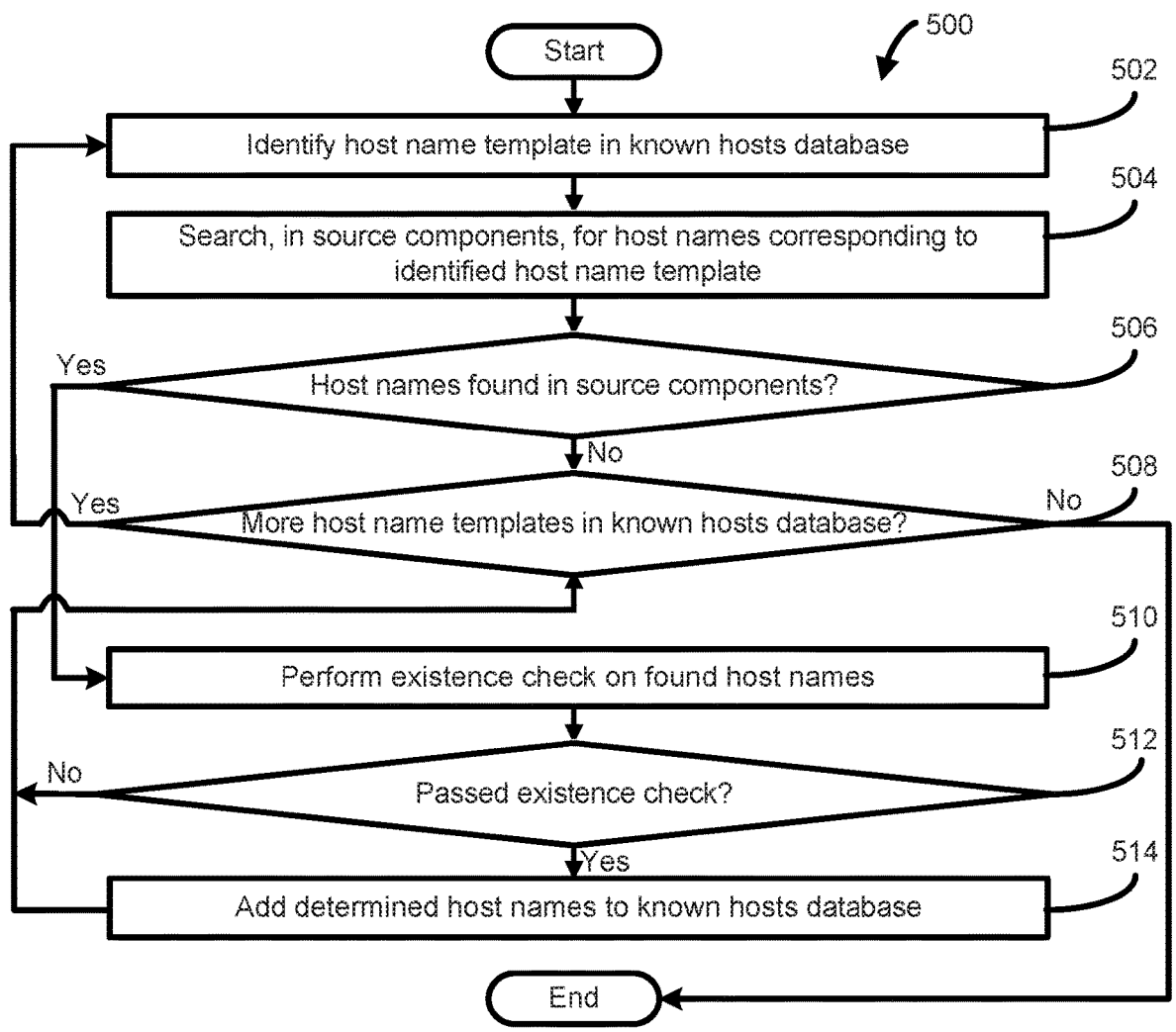

FIG. 8 is a flow diagram illustrating a method 500 according to some examples. In some examples, the orderings shown may be varied, some elements may occur simultaneously, some elements may be added, and some elements may be omitted. In describing FIG. 8, reference will be made to elements described in FIG. 4. In examples, any of the elements described earlier relative to FIG. 4 may be implemented in the process shown in and described relative to FIG. 8.

At 502, the template identifier 136 may identify, in the known hosts database 148, host name templates. Any processes previously described as implemented by the template identifier 136 may be implemented at 502.

At 504, for each host name template identified by the template identifier 136, the template searcher 138 may search, in the plurality of source components (e.g. all of the source components) of the network 102, for particular host names corresponding to the identified host name template. Any processes previously described as implemented by the template searcher 138 may be implemented at 504.

At 506, if any host names are found in any source components, the method 500 may proceed to 510, otherwise the method 500 may proceed to 508.

At 508, if there are more host name templates in the known hosts database 148, the method 500 may proceed to 502, otherwise the method 500 may end.

At 510, the existence checker 140 may perform an existence check on the host names found by the template searcher 138 to determine if the host name corresponds to a real source component. Any processes previously described as implemented by the existence checker 140 may be implemented at 510.

At 512, if the existence check is passed, the method 500 may proceed to 514, otherwise the method 500 may proceed to 508.

At 514, the host name adder 142 may, in response to the existence check passing, add the host names found to correspond to the host name template to the known hosts database 148. Any processes previously described as implemented by the host name adder 142 may be implemented at 514. The method 500 may proceed to 508.

In some examples, the method 500 may not end, and may continually operate in an online mode, and instead of ending after 508 returns "no", the method 500 may proceed to 502. At that point, the topology may need refreshing, and/or new host name templates may be available in the known hosts database 148.

Any of the processors discussed herein may comprise a microprocessor, a microcontroller, a programmable gate array, an application specific integrated circuit (ASIC), a computer processor, or the like. Any of the processors may, for example, include multiple cores on a chip, multiple cores across multiple chips, multiple cores across multiple devices, or combinations thereof. In some examples, any of the processors may include at least one integrated circuit (IC), other control logic, other electronic circuits, or combinations thereof. Any of the non-transitory computer-readable storage media described herein may include a single medium or multiple media. The non-transitory computer readable storage medium may comprise any electronic, magnetic, optical, or other physical storage device. For example, the non-transitory computer-readable storage medium may include, for example, random access memory (RAM), static memory, read only memory, an electrically erasable programmable read-only memory (EEPROM), a hard drive, an optical drive, a storage drive, a CD, a DVD, or the like.

All of the features disclosed in this specification (including any accompanying claims, abstract and drawings), and/or all of the elements of any method or process so disclosed, may be combined in any combination, except combinations where at least some of such features and/or elements are mutually exclusive.

In the foregoing description, numerous details are set forth to provide an understanding of the subject matter disclosed herein. However, examples may be practiced without some or all of these details. Other examples may include modifications and variations from the details discussed above. It is intended that the appended claims cover such modifications and variations.

The invention claimed is:

1. A non-transitory computer-readable storage medium comprising instructions executable by a processor to:
   identify, in a database, a host name that is known to correspond to a first source component;
   search the host name in a second source component, outside the database; and
   infer a topological linkage between the first and the second source components in response to finding the host name in the second source component.

2. The non-transitory computer-readable storage medium of claim 1 wherein to search the host name comprises to search the host name in unstructured data comprising log messages stored in the second source component.

3. The non-transitory computer-readable storage medium of claim 1 wherein to search the host name comprises to search structured data contained in known fields stored in the second source component to identify the host name.

4. The non-transitory computer-readable storage medium of claim 1 wherein the host name comprises a web address, 1Pv4 address, or 1Pv6 address.

5. The non-transitory computer-readable storage medium of claim 1 further comprising instructions executable by the processor to infer another topological linkage between the second and a third source component, wherein the topological linkage and the another topological linkage together form a topology of the first, second, and third source components.

6. The non-transitory computer-readable storage medium of claim 5 further comprising instructions executable by the processor to:
identify another host name that is known to correspond to the third source component; search the another host name in data stored in the second source component; and
infer the another topological linkage between the second and the third source components in response to finding the host name in the data stored in the second source component.

7. The non-transitory computer-readable storage medium of claim 5 further comprising instructions executable by the processor to:
identify another host name that is known to correspond to the second source component; search the another host name in data stored in the third source component; and
infer the another topological linkage between the second and the third source components in response to finding the host name in the data stored in the third source component.

8. The non-transitory computer-readable storage medium of claim 5 wherein the topological linkage and the another topological linkage are each first order topological linkages, and further comprising instructions executable by the processor to infer a second order topological linkage between the first and the third source components.

9. The non-transitory computer-readable storage medium of claim 8 further comprising instructions executable by the processor not to infer topological linkages above a maximum nth order topological linkage.

10. The non-transitory computer-readable storage medium of claim 5 further comprising instructions executable to output the topology for display on an output device.

11. The non-transitory computer-readable storage medium of claim 1 further comprising instructions executable by the processor to:
identify a known domain name;
search the known domain name in a plurality of source components;
derive the host name from the known domain name in response to finding an instance of the known domain name in at least one of the plurality of source components; and
add the host name to the database.

12. The non-transitory computer-readable storage medium of claim 11 wherein to derive the host name comprises to:
extract a fully qualified domain name (FQDN) in which the instance of the known domain name was found; and
designate the FQDN as the host name.

13. The non-transitory computer-readable storage medium of claim 11 wherein to derive the host name comprises to:
extract a fully qualified domain name (FQDN) in which the instance of the known domain name was found; and
determine the host name by using Domain Name System (DNS) resolution on the extracted FQDN.

14. The non-transitory computer-readable storage medium of claim 1 further comprising instructions executable by the processor to:
identify a known host name template;
search, in a plurality of source components, for a particular host name corresponding to the identified known host name template;
perform an existence check on the particular host name;
add the particular host name to the database as the host name in response to the existence check passing.

15. The non-transitory computer-readable storage medium of claim 14 wherein the known host name template is a regular expression.

16. The non-transitory computer-readable storage medium of claim 1 wherein the database includes a plurality of known host names including the host name, a plurality of known domain names, and a plurality of known host name templates.

17. The non-transitory computer-readable storage medium of claim 1 wherein to infer a topological linkage comprises to infer the topological linkage between the first and the second source components in response to finding a threshold amount of plurality of instances of the host name in the second source component.

18. The non-transitory computer-readable storage medium of claim 1 further comprising instructions executable by the processor to invalidate the topological linkage after a threshold period of time has elapsed.

19. A system comprising:
a processor; and
a memory comprising instructions executable by the processor to:
access, in a known hosts database, host names identifying respective source components that are among a plurality of source components of a computer system;
search for the host names in at least some of the plurality of source components, outside of the hosts database;
infer topological linkages between the plurality of source components based on
finding the host names in the at least some of the plurality of source components; and
add the topological linkages to a determined topology model of the computer system.

20. A method comprising:
by a processor:
receiving, from a first source component in a computer system, a first host name known to correspond to the first source component, the first host name found in a log stream or in a structured data field;
comparing the first host name to a second host name in a known hosts database, the second host name corresponding to a second source component; and
determining that a topological linkage exists between the first and the second source components based on the comparison indicating that the first and the second host names are the same.

* * * * *